(12) United States Patent
Sarabandi et al.

(10) Patent No.: US 11,108,165 B2
(45) Date of Patent: Aug. 31, 2021

(54) RADIO FREQUENCY FRONT END FOR FULL DUPLEX WIRELESS COMMUNICATIONS

(71) Applicant: THE REGENTS OF THE UNIVERSITY OF MICHIGAN, Ann Arbor, MI (US)

(72) Inventors: Kamal Sarabandi, Ann Arbor, MI (US); Tanner J. Douglas, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 194 days.

(21) Appl. No.: 16/542,839

(22) Filed: Aug. 16, 2019

(65) Prior Publication Data
US 2020/0059011 A1    Feb. 20, 2020

Related U.S. Application Data

(60) Provisional application No. 62/765,243, filed on Aug. 17, 2018.

(51) Int. Cl.
*H01Q 21/06*    (2006.01)
*H04L 5/14*    (2006.01)
*H01Q 9/04*    (2006.01)

(52) U.S. Cl.
CPC ........... *H01Q 21/065* (2013.01); *H01Q 9/045* (2013.01); *H04L 5/14* (2013.01)

(58) Field of Classification Search
CPC . H04L 5/14; H04L 5/0001; H04L 5/16; H04L 25/026; H04L 25/0264;
(Continued)

(56) References Cited

U.S. PATENT DOCUMENTS 9,520,908 B2    12/2016 Li
2012/0188917 A1    7/2012 Knox
(Continued)

FOREIGN PATENT DOCUMENTS

WO    WO-2016172651 A9    11/2016

OTHER PUBLICATIONS

Mayank Jain, et al., Practical, real-time full duplex wireless, Proceedings of the 17th annual international conference on Mobile computing and networking. ACM, 2011.
(Continued)

*Primary Examiner* — Wei (Victor) Y Chan
(74) *Attorney, Agent, or Firm* — Harness, Dickey & Pierce, P.L.C.

(57) ABSTRACT

An antenna system includes a ground and a substrate mounted on the ground. The antenna system includes a first transmitter antenna and a second transmitter antenna configured to transmit a first signal at a predetermined frequency. The first transmitter antenna has a first longitudinal axis and is mounted in a first quadrant of the substrate. The second transmitter antenna has a second longitudinal axis and is mounted in a second quadrant of the substrate. The antenna system includes a first receiver antenna and a second receiver antenna configured to receive a second signal at the predetermined frequency. The first receiver antenna has a third longitudinal axis and is mounted in a third quadrant of the substrate. The third longitudinal axis of the first receiver antenna is oriented orthogonal to the first longitudinal axis of the first transmitter antenna and the second longitudinal axis of the second transmitter antenna.

12 Claims, 6 Drawing Sheets

(58) Field of Classification Search
CPC .. H04L 27/0002; H04L 27/2656; H01Q 9/045; H01Q 21/065
See application file for complete search history.

(56) References Cited

U.S. PATENT DOCUMENTS

| | | | |
|---|---|---|---|
| 2015/0318976 A1 | 11/2015 | Eltawil et al. | |
| 2016/0240912 A1 | 8/2016 | Zhang et al. | |
| 2017/0054472 A1 | 2/2017 | Zhang | |
| 2020/0350948 A1* | 11/2020 | Gurbuz | H04L 5/14 |

OTHER PUBLICATIONS

Jung Il Choi, et al., Achieving single channel, full duplex wireless communication, Proceedings of the sixteenth annual international conference on Mobile computing and networking. ACM, 2010.

Eugeniy V. Rogozhnikov, et al., Full duplex wireless communication system, analog cancellation: Review of methods and experimental research, Control and Communications (SIBCON), 2016.

Evan Everett, et al., Empowering full-duplex wireless communication by exploiting directional diversity, Signals, Systems and Computers (ASILOMAR), 2011 Conference Record of the Forty Fifth Asilomar Conference on IEEE, 2011.

Ashutosh Sabharwal, et al., In-band full-duplex wireless: Challenges and opportunities, IEEE Journal on Selected Areas in Communications 32.9, 2014, pp. 1637-1652.

Zhiliang Zhang, et al., Full duplex 2x2 MIMO radios, Wireless Communications and Signal Processing (WCSP), 2014 Sixth International Conference on IEEE, 2014.

Lauri Anttila, et al., Modeling and efficient cancellation of nonlinear self-interference in MIMO full-duplex transceivers, Globecom Workshops (GC Wkshps), IEEE, 2014.

Amir K. Khandani, Full-duplex (two-way) wireless: Antenna design and signal processing, 2012.

Ingrid Lunden, Kumu Networks Nabs $25M From Cisco and Big Carriers for 'Breakthrough' Wireless Tech, TechCrunch URL: http://tcrn.ch/1S47LAn, Jan. 20, 2016.

* cited by examiner

RADIO FREQUENCY FRONT END FOR FULL DUPLEX WIRELESS COMMUNICATIONS

CROSS-REFERENCE TO RELATED APPLICATIONS

This application claims the benefit of U.S. Provisional Application 62/765,243, filed Aug. 17, 2018. The entire disclosure of the above application is incorporated herein by reference.

FIELD

The present disclosure relates to wireless communications and, more specifically, antenna configurations to provide isolation between a transmitter antenna and a receiver antenna.

BACKGROUND

As mobile communication technologies continue to develop, and the demand for more, cheaper, and faster data increases, it is necessary to implement spectrum-efficient communication techniques to minimize further cluttering of the already congested radio spectrum.

Electromagnetic spectrum that can be used for wireless communication is limited. Additionally, spectrum for wireless communication is an expensive commodity. Since additional spectrum cannot be created, efficient use of electromagnetic spectrum is one way to enhance wireless service. Currently, frequency duplexing is used at wireless nodes to enable simultaneous transmission and reception. That is, a frequency channel is used to transmit a signal and a separate channel is used to receive other signal. This approach reduces the available spectrum by half.

This section provides background information related to the present disclosure which is not necessarily prior art.

SUMMARY

An antenna system includes a ground and a substrate mounted on the ground. The substrate is divided into quadrants. The antenna system includes a first transmitter antenna and a second transmitter antenna configured to transmit a first signal at a predetermined frequency. The first transmitter antenna has a first longitudinal axis and is mounted in a first quadrant of the substrate. The second transmitter antenna has a second longitudinal axis and is mounted in a second quadrant of the substrate. The antenna system includes a first receiver antenna and a second receiver antenna configured to receive a second signal at the predetermined frequency. The first receiver antenna has a third longitudinal axis and is mounted in a third quadrant of the substrate. The third longitudinal axis of the first receiver antenna is oriented orthogonal to the first longitudinal axis of the first transmitter antenna and the second longitudinal axis of the second transmitter antenna. The second receiver antenna has a fourth longitudinal axis and is mounted in a fourth quadrant of the substrate. The fourth longitudinal axis of the second receiver antenna is oriented orthogonal to the first longitudinal axis of the first transmitter antenna and the second longitudinal axis of the second transmitter antenna.

In other features, the first transmitter antenna, the second transmitter antenna, the first receiver antenna, and the second receiver antenna are linearly polarized. In other features, the ground has a Y-axis extending substantially parallel to the first longitudinal axis and the second longitudinal axis and an X-axis extending substantially parallel to the third longitudinal axis and the fourth longitudinal axis. The Y-axis is located at a center of the substrate and the X-axis is located at the center of the substrate. A feed point of the first transmitter antenna and a feed point of the second transmitter antenna are positioned adjacent to the Y-axis, and a feed point of the first receiver antenna and a feed point of the second receiver antenna are positioned adjacent to the X-axis.

In other features, the feed point of the first transmitter antenna is positioned along the third longitudinal axis, and the feed point of the second transmitter antenna is positioned along the fourth longitudinal axis. The feed point of the first receiver antenna is positioned along the second longitudinal axis, and the feed point of the second receiver antenna is positioned along the first longitudinal axis. In other features, a geometric center of the first transmitter antenna is located at a geometric center of the first quadrant of the substrate. A geometric center of the second transmitter antenna is located at a geometric center of the second quadrant of the substrate. A geometric center of the first receiver antenna is located at a geometric center of the third quadrant of the substrate. A geometric center of the second receiver antenna is located at a geometric center of the fourth quadrant of the substrate.

In other features, the first transmitter antenna, the second transmitter antenna, the first receiver antenna, and the second receiver antenna are rectangular patch antennas. In other features, the first transmitter antenna, the second transmitter antenna, the first receiver antenna, and the second receiver antenna are U-slot patch antennas. In other features, the U-slot patch antennas are configured to include a slot thickness of 3.58 millimeters, a slot width of 19 millimeters, and a slot length of 25.1 millimeters. In other features, the system is coupled to a feed network. In other features, the feed network is configured to feed the first transmitter antenna and the second transmitter antenna one hundred and eighty degrees out-of-phase and subtract signals received from the first receiver antenna and the second receiver antenna.

In other features, the first transmitter antenna is in direct physical contact with the substrate, the second transmitter antenna is in direct physical contact with the substrate, the first receiver antenna is in direct physical contact with the substrate, and the second receiver antenna is in direct physical contact with the substrate.

A method for configuring an antenna to transmit and receive signals at a predetermined frequency includes mounting a first transmitting antenna on a first section of a substrate and mounting a first receiving antenna on the substrate in a second section of the substrate. The first receiving antenna is oriented such that a first receive feed point of the first receiving antenna is adjacent to the first transmitting antenna. The configuring includes mounting a second receiving antenna on the substrate in a third section of the substrate and mounting a second transmitting antenna on a fourth section of the substrate. The second receiving antenna is oriented such that a second receive feed point of the second receiving antenna is adjacent to the second transmitting antenna.

In other features, a first transmit feed point of the first transmitting antenna is adjacent to a second transmit feed point of the second transmitting antenna, and the first receive feed point of the first receiving antenna is adjacent to the second receive feed point of the second receiving antenna.

In other features, the first section, the second section, the third section, and the fourth section of the substrate are quadrants, and the quadrants are a same size. In other features, the method includes coupling a feed network the first transmitting antenna and the second transmitting antenna. The feed network is configured to feed the first transmitting antenna and the second transmitting antenna one hundred and eighty degrees out-of-phase and subtract signals received from the first receiving antenna and the second receiving antenna to isolate a transmitted signal and a received signal at the predetermined frequency.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
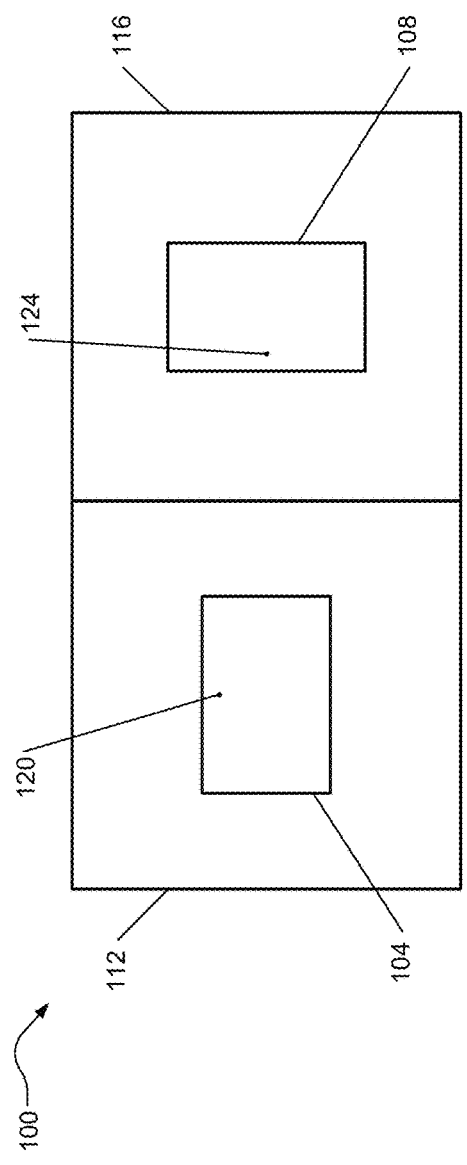
FIG. 1A is a graphical depiction of an example antenna configuration including a transmitter coupled to a receiver.

FIG. 1A depicts an example antenna 100 configuration including a transmitter 104 on the left coupled to a receiver 108 on the right. Alternatively, the arrangement of the antennas may include the receiver 108 on the left of the transmitter 104. While rectangular patch antennas are shown in FIG. 1A, U-slotted rectangular patch antennas may be used as the transmitter 104 and the receiver 108. The transmitter 104 and the receiver 108 are mounted on a substrate divided into a transmitter quadrant 112 and a receiver quadrant 116, respectively. The substrate is mounted on a ground. The transmitter 104 is excited by a coaxial probe fed from behind the transmitter quadrant 112 through the substrate to the transmitter 104. The substrate is the same size as or smaller than the ground.

The transmitter 104 has a transmitter feed point 120, and the receiver 108 has a receiver feed point 124. The transmitter 104 and receiver 108 may be placed adjacent to each other with orthogonal orientations. For example, in FIG. 1A, the receiver 108 is positioned such that the receiver feed point 124 is adjacent to the transmitter 104. The transmitter feed point 120 is adjacent to a top edge of the antenna 100. In other embodiments, the receiver 108 may be positioned such that the receiver feed point 124 is directed adjacent to an outward edge of the antenna 100. By orienting the antennas in such a way, as also shown in subsequent figures, improved isolation is achieved to allow for single frequency transmission and reception.

As stated above, the described systems allow for simultaneous transmission and reception at the same channel, potentially doubling the number of users across the limited wireless communication channels by using the same frequency channel for transmitting and receiving. The antenna can achieve 70-80 dB isolation over a relatively wide bandwidth. In addition, novel leakage cancellation circuitry can be added to the radio frequency (RF) front end to achieve additional isolation. The leakage cancellation circuitry can be made tunable to adoptably maintain a high isolation. Moreover, additional cancellation at the intermediate frequency (IF) level may also be achieved within a given channel. Digital cancellation can achieve even higher isolation since the transmitter signal is known, allowing the use of appropriate circuitry to ensure maximum cancellation.

Such leakage cancellation and signal channel transmission and reception can apply to the wireless industry (as well as military applications) to increase the bandwidth available for wireless services. Moreover, reducing a number of wireless channels required to complete a communication results in the number of available wireless channels increasing, evening doubling. Therefore, wireless services can accommodate twice the number of wireless users on their wireless channels or wireless services could provide users with a higher data rate.

This antenna system has potential applications across several disciplines. One major application is in full-duplex communication systems. Assuming a maximum power output of 40 dBm, an additional isolation of about 30 dB that can be achieved at the IF band, and the fact that signal processing algorithms are capable of attenuating known transmit signals at baseband by 30 dB, 80 dB of RF isolation can reduce the transmitter leakage to about −90 dBm or less. This will be sufficient for most practical cases to detect the desired received signals with a relatively high signal to interference ratio. Additionally, the antenna system could be utilized in high-cross-section active radar calibration targets.

The designs presented may have a relatively narrow band of operation centered at 6 GHz for demonstration of the concept. The surrounding frequency band from roughly 5 GHz to 7 GHz is licensed by the FCC for applications in mobile communications, fixed-satellite service, radio-location, and radio navigation. With some minor scaling, the antenna system could be adjusted to shift the operation frequency to meet the needs of applications in any of these areas. Furthermore, the bandwidth can be enhanced by using different radiating elements and a modified feed network, allowing for operation over a much larger portion of the C band.

As mentioned above, the antenna increases communication efficiency by enabling communication of simultaneous transmit and receive signals at a single frequency. Since frequency division duplexing uses separate frequencies for transmitting and receiving, condensing both directions into a single frequency will effectively double the amount of data that can be communicated in a given bandwidth. Additionally, short-range radars such as automotive radars may make use of a continuous-wave spectrum to keep the peak transmit power low. For such systems, very high isolation between transmit and receive signals is needed for high receiver dynamic range and small target detection. As a result, the transmit and receive antennas are usually separated to achieve better isolation.

In the embodiments of FIG. 1A-5, the transmitter and receiver are linearly polarized and oriented orthogonal to each other to improve isolation. In this arrangement, ideally, the transmitter and the receiver would not interfere with each other. However, since all antennas generate cross-polarized fields, the antenna is further arranged according to a special symmetry to achieve high isolation between orthogonally polarized patch antennas. Such symmetry in the antenna will allow for the implementation of a compact, two-port, planar antenna system with very high isolation.

In additional embodiments, a rectangular patch antenna may be used as the antenna. Rectangular patch antennas are linearly polarized and their bandwidth can be increased by including U-shaped slots in the patch. Furthermore, in the dominant resonant mode, the patch length of a rectangular patch antenna is approximately equal to half of the wavelength, with fields symmetric about the center point. Therefore, a rectangular patch excited by two in-phase sources located symmetrically about its center should experience cancellation of the fields. Therefore, any net field that is present would be the result of only external sources.

Figure 1B:
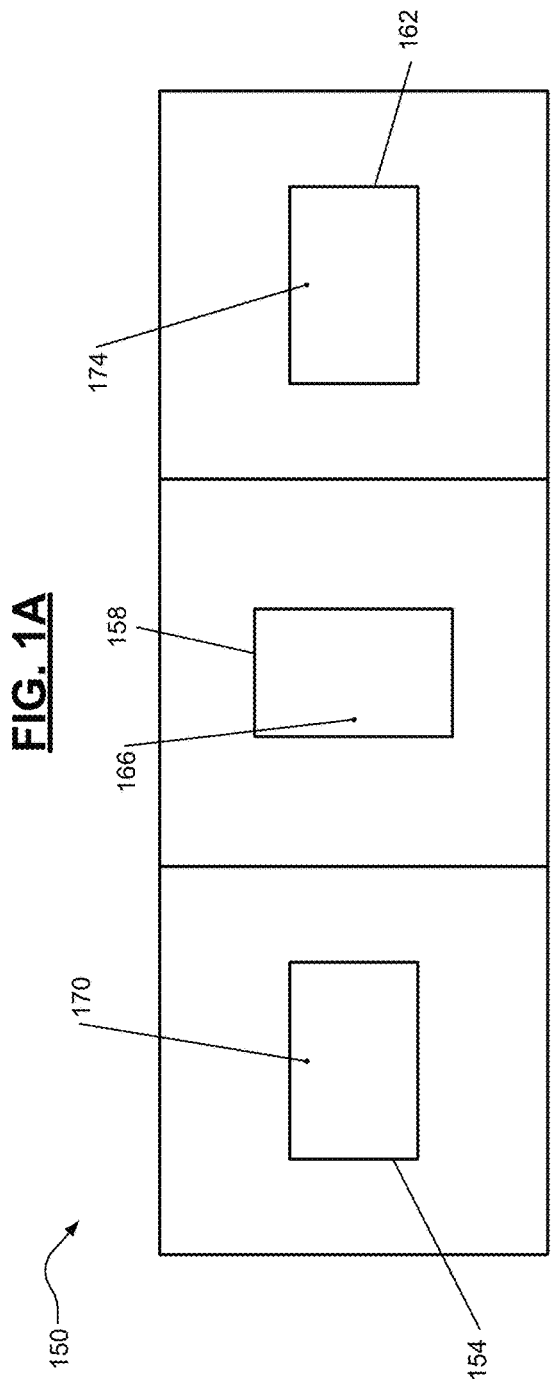
FIG. 1B is a graphical depiction of an example antenna configuration including a left transmitter coupled to a middle receiver coupled to a right transmitter.

FIG. 1B depicts an example antenna 150 configuration including a left transmitter 154 on the left coupled to a middle receiver 158 in the middle coupled to a right transmitter 162 on the right. The antenna 150 uses two identical radiating elements for transmission (the left transmitter 154 and the right transmitter 162) positioned on either side of an orthogonally oriented receiver (the middle receiver 158). The isolation in the configuration of FIG. 1B can be improved compared to simply placing the transmitter and receiver adjacent to each other, as shown in FIG. 1A. The middle receiver 158 is positioned such that a middle feed point 166 is adjacent to the left transmitter 154. Both the left transmitter 154 and the right transmitter 162 are oriented with each feed point (170 and 174, respectively) adjacent to a top edge of the antenna 150.

The configurations depicted in FIGS. 1A and 1B can implement the rectangular patch antenna, as shown, or other antenna geometries, such as a U-slot patch antenna. For example, when using a U-slot receiver and symmetry cancellation, isolation slightly improves over the entire frequency band of interest, for example, 1.7 GHz to 2.2 GHz. At any given frequency in this band, the configuration of FIG. 1B outperforms the configurations of FIG. 1A. On average over the band, the configuration of FIG. 1B outperformed the others by 6.2 dB or more. Similarly, the configuration of FIG. 1B outperforms other configurations when the middle receiver 158 is a rectangular patch antenna, as shown.

With either type of receiver, symmetry cancellation provides a benefit, despite deviations of symmetry of the geometry due to the feed position and U-slot. Therefore, generally speaking, with higher symmetry of the receiver geometry, greater isolation is possible. Therefore, applications with a narrower band of interest that can implement this method and geometry could be used to achieve even higher levels of isolation improvement.

Figure 2:
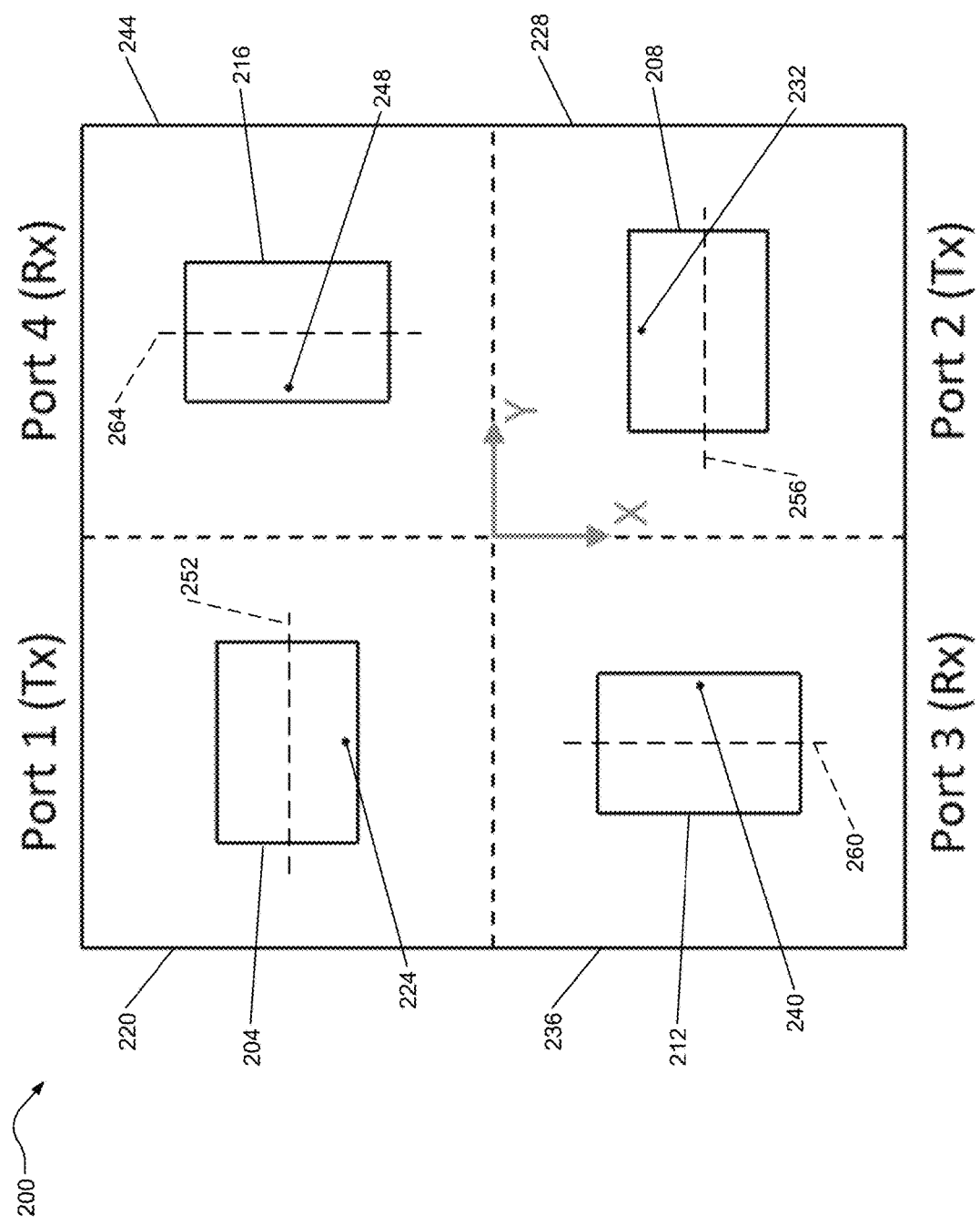
FIG. 2 is a graphical depiction of an example antenna including four patch elements: a first transmitter, a second transmitter, a first receiver, and a second receiver.

Referring now to FIG. 2, an example antenna 200 including four patch elements: a first transmitter 204, a second transmitter 208, a first receiver 212, and a second receiver 216. The first transmitter 204 is mounted within a first substrate quadrant 220 and has a first transmit feed point 224. The second transmitter 208 is mounted within a second substrate quadrant 228 and has a second transmit feed point 232. The first receiver 212 is mounted within a third substrate quadrant 236 and has a first receive feed point 240.

The second receiver 216 is mounted within a fourth substrate quadrant 244 and has a second receive feed point 248.

The first transmitter 204, second transmitter 208, first receiver 212, and second receiver 216 are arranged in a square grid with ninety-degree rotational symmetry about the center. In this configuration, the coupling between transmitter-receiver pairs are equal. Therefore, by exciting the first transmitter 204 and the second transmitter 208 perfectly out-of-phase and subtracting the signals from the first receiver 212 and the second receiver 216, high levels of cancellation is achieved, providing isolation greater than 60 dB.

In other words, the first substrate quadrant 220 includes a first axis 252. The second substrate quadrant 228 includes a second axis 256. The third substrate quadrant 236 includes a third axis 260. The fourth substrate quadrant 244 includes a fourth axis 264. The first axis extends substantially parallel to the second axis and substantially perpendicular to the third axis and the fourth axis.

A substrate includes each quadrant of the substrate (220, 228, 236, and 244) and has a Y-axis extending substantially parallel to the first axis 252 and the second axis 256. The substrate also has an X-axis extending substantially parallel to the third axis 260 and the fourth axis 264. The first transmit feed point 224 and the second transmit feed point 232 are positioned adjacent to the Y-axis, and the first receive feed point 240 and the second receive feed point 248 are positioned adjacent to the X-axis.

The antenna 200 functions by exploiting the ninety-degree rotational symmetry of a square grid. The operating principle behind the design of FIG. 2 is the near equality of the transmission coefficients between any pair of transmitter patches and receiver patches, e.g., the first transmitter 204 and the second transmitter 208 pair as well as the first receiver 212 and the second receiver 216 pair.

To illustrate the operation of the antenna 200 of FIG. 2 mathematically, the scattering parameters of a four-port network are considered, with each port corresponding to one of the four patch elements. The scattering parameters for an N-port network are defined in Equation 1 as follows:

$$\begin{bmatrix} V_1^- \\ V_2^- \\ \vdots \\ V_N^- \end{bmatrix} = \begin{bmatrix} S_{11} & S_{12} & \ldots & S_{1N} \\ S_{21} & S_{22} & \ldots & S_{2N} \\ \vdots & \vdots & \ddots & \vdots \\ S_{N1} & S_{N2} & \ldots & S_{NN} \end{bmatrix} \begin{bmatrix} V_1^+ \\ V_2^+ \\ \vdots \\ V_N^+ \end{bmatrix} \quad (1)$$

Suppose the first transmitter 204 is assigned port label 1, the second transmitter 208 is assigned port label 2, the first receiver 212 is assigned port label 3, and the second receiver 216 is assigned port label 4. Due to the ninety-degree rotational symmetry of the geometry of the antenna 200, all of the diagonal elements of the scattering matrix are equal. Furthermore, the rotational symmetry in combination with the reciprocity theorem dictate that the coupling between either the first transmitter 204 or the second transmitter 208 with either the first receiver 212 or the second receiver 216 will be equal. Further, the coupling between the first transmitter 204 and the second transmitter 208 is equal to the coupling between the first receiver 212 and the second receiver 216. Therefore, the scattering matrix can be simplified in Equation 2 as follows:

$$\begin{bmatrix} S_{11} & S_{12} & S_{13} & S_{14} \\ S_{21} & S_{22} & S_{23} & S_{24} \\ S_{31} & S_{32} & S_{33} & S_{34} \\ S_{41} & S_{42} & S_{43} & S_{44} \end{bmatrix} = \begin{bmatrix} S_1 & S_2 & S_3 & S_3 \\ S_2 & S_1 & S_3 & S_3 \\ S_3 & S_3 & S_1 & S_2 \\ S_3 & S_3 & S_2 & S_1 \end{bmatrix} \qquad (2)$$

Suppose that the transmitters are excited with equal magnitude and opposite phase, and that there exist impedance mismatches at the port label 3 and the port label 4. Then, the following relations can be made in Equation 3:

$$V_2^+ = -V_1^+$$

$$V_3^+ = \Gamma_3 V_3^-$$

$$V_4^+ = \Gamma_4 V_4^- \qquad (3)$$

where $\Gamma_3$ and $\Gamma_4$ are reflection coefficients due to the mismatch of the port label 3 and the port label 4. These reflection coefficients are defined looking out of port label 3 and port label 4 and looking into the respective loads, and arise if the loads are not matched to the system impedance. Substituting Equation 2 and Equation 3 into the third and fourth rows of Equation 1, Equation 4 is obtained:

$$V_3^- = S_3 V_1^+ - S_3 V_1^+ + S_1 \Gamma_3 V_3^- + S_2 \Gamma_4 V_4^-$$

$$V_4^- = S_3 V_1^+ - S_3 V_1^+ + S_2 \Gamma_3 V_3^- + S_1 \Gamma_4 V_4^- \qquad (4)$$

The first two terms of the right hand side of each equation above cancel, and the solution of Equation 4 is $V_3^- = V_4^- = 0$, unless $(1 - S_1 \Gamma_3)(1 - S_1 \Gamma_4) = S_2^2 \Gamma_3 \Gamma_4$. However, this condition cannot be the case in general, since there is no deterministic relationship between the scattering parameters and reflection coefficients. Furthermore, the scattering parameters and reflection coefficients are expected to be close to zero, in which case, the above condition is clearly false, as the left hand side is approximately one and the right hand side is approximately zero. Thus under these conditions, the coupling from the first transmitter 204 and the second transmitter 208 to the first receiver 212 and the second receiver 216 is entirely canceled. Note that while the first transmitter 204 and the second transmitter 208 are excited out-of-phase, they are also oriented in the opposite direction. Therefore, the main lobe of the beam still points in the desired boresight direction.

To ensure that the receiver beam also points in this direction, the signals are subtracted at the port label 3 and port label 4. Assuming the first receiver 212 and the second receiver 216 are presented with matched loads ($\Gamma_3 = \Gamma_4 = 0$), the fourth row can be subtracted from the third row of Equation 1 to obtain Equation 5:

$$V_3^- - V_4^- = (S_{31} - S_{32} - S_{41} + S_{42}) V_1^+ \qquad (5)$$

Therefore, the isolation can be measured as $S_{31} - S_{32} - S_{41} + S_{42}$. From Equation 2, each of these parameters is expected to be equal to each other, achieving nearly perfect isolation.

In additional embodiments, a feed network is used for the antenna 200 to cancel leakage. The feed network may consist of two one-hundred-eighty-degree hybrid couplers, microstrip traces to connect to the patch probes, and resistor pads to terminate the isolated ports of the couplers. The feed network may share a ground plane with the patch elements and may have a substrate with $\varepsilon_r = 2.2$ and height h=0:127 mm (0.005 in.). The very thin substrate helps minimize unwanted coupling between the traces.

With the first transmitter 204 and the second transmitter 208 now connected to the first receiver 212 and the second receiver 216 via the couplers, the antenna 200 may now be treated as a two-port network. Isolation can therefore be measured directly by observing the $S_{21}$ scattering parameter.

Although theoretically the symmetric array configuration used in the above feed network should exhibit complete cancellation of coupled fields between the patch elements, and although simulations of the array without including the feed network indicated isolation potentially as high as 90 dB, the addition of the feed network (for example, shown in FIG. 6) reduces the simulated isolation to only 66.2 dB. A major contributing factor to this significant drop-off is the coupling between the microstrip traces within the feed network. For this reason, it is important to minimize the thickness of the feed network substrate in order to confine the fields closely around the copper traces. It is possible that using other transmission line architectures, such as stripline or grounded coplanar waveguide could provide better performance.

Figure 6:
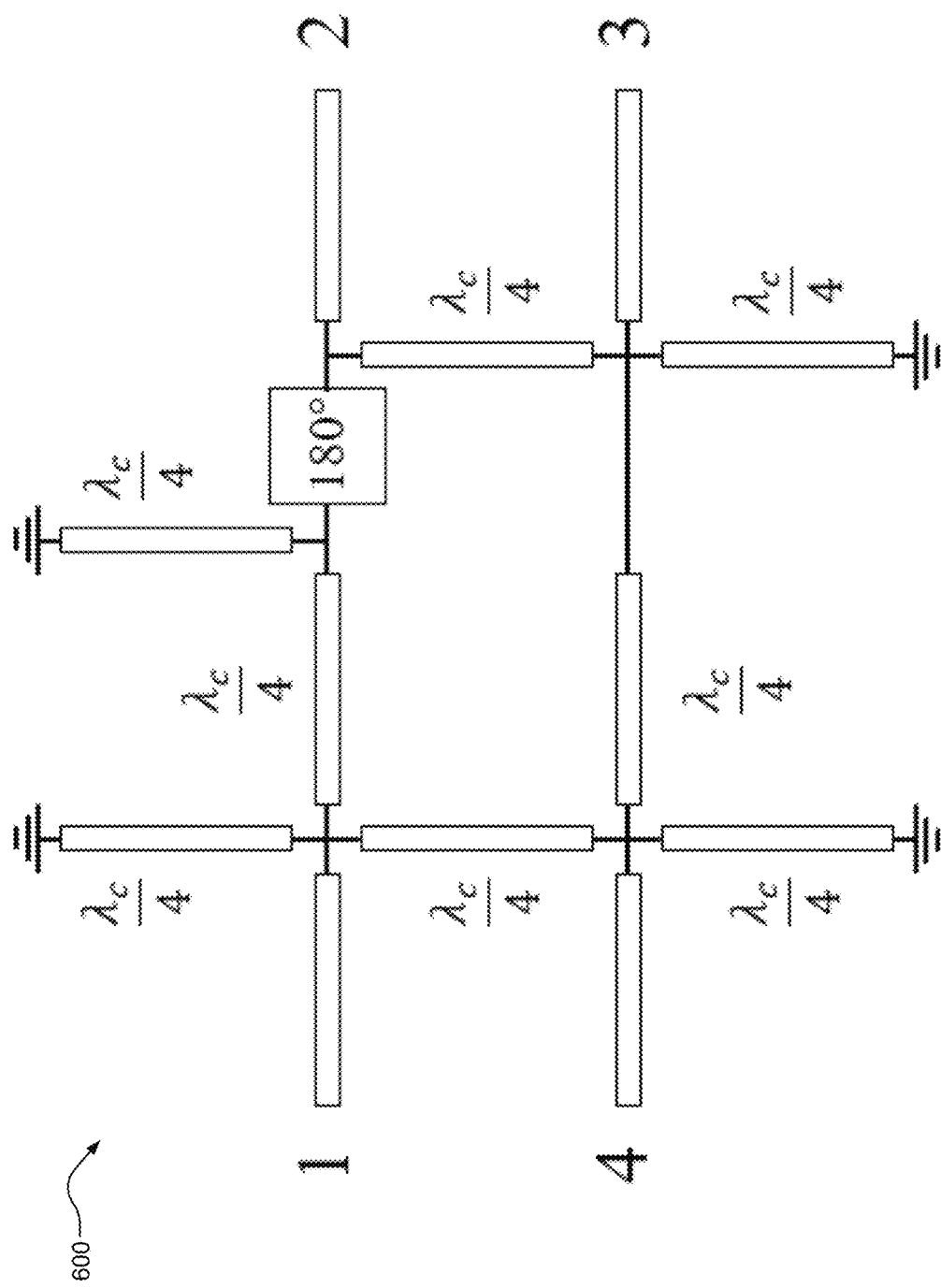
FIG. 6 is a graphical depiction of an example implementation of a one-hundred-eighty-degree hybrid coupler for use in wideband applications.

Additionally, there is a correlation between the isolation and the fineness of the mesh used in the substrates and copper traces. In further embodiments, the isolation can be improved by using a finer mesh. FIG. 6 shows an example feed network for the antenna 200 of FIG. 2.

Figure 3:
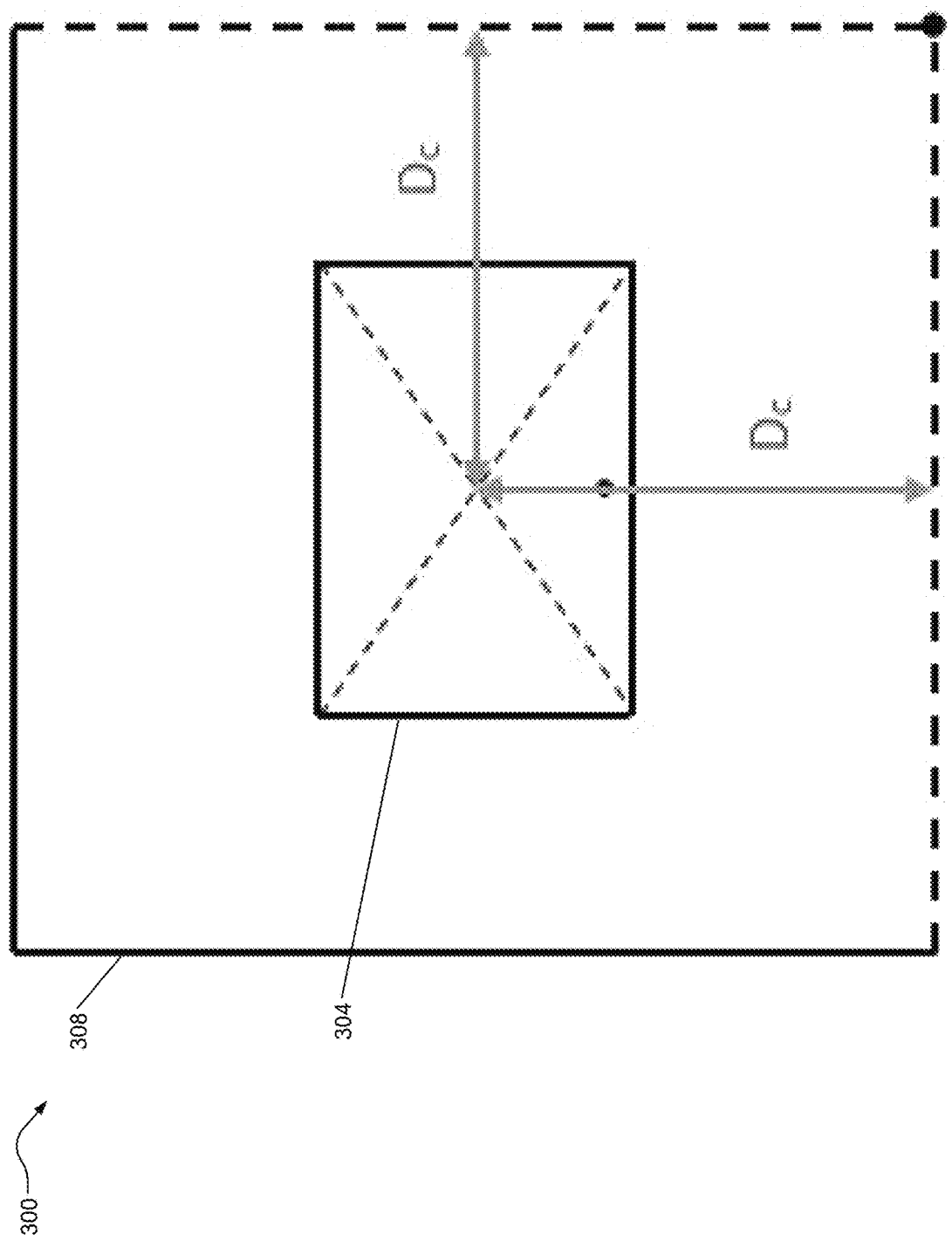
FIG. 3 is a graphical depiction of a positioning of an example antenna include a patch element mounted on a substrate.

FIG. 3 depicts a positioning of an example antenna 300 including a patch element 304 mounted on a substrate 308. The distance between the center of the patch element 304 and the edge of its quadrant or substrate 308 ($D_c$) may vary. For example, the dimension $D_c$ may be 25.40 mm (1.000 in.) in FIG. 3. As shown, the patch element 304 is centered on the substrate 308. In other embodiments, the patch element 304 may be mounted off center on the substrate 308.

Figure 4:
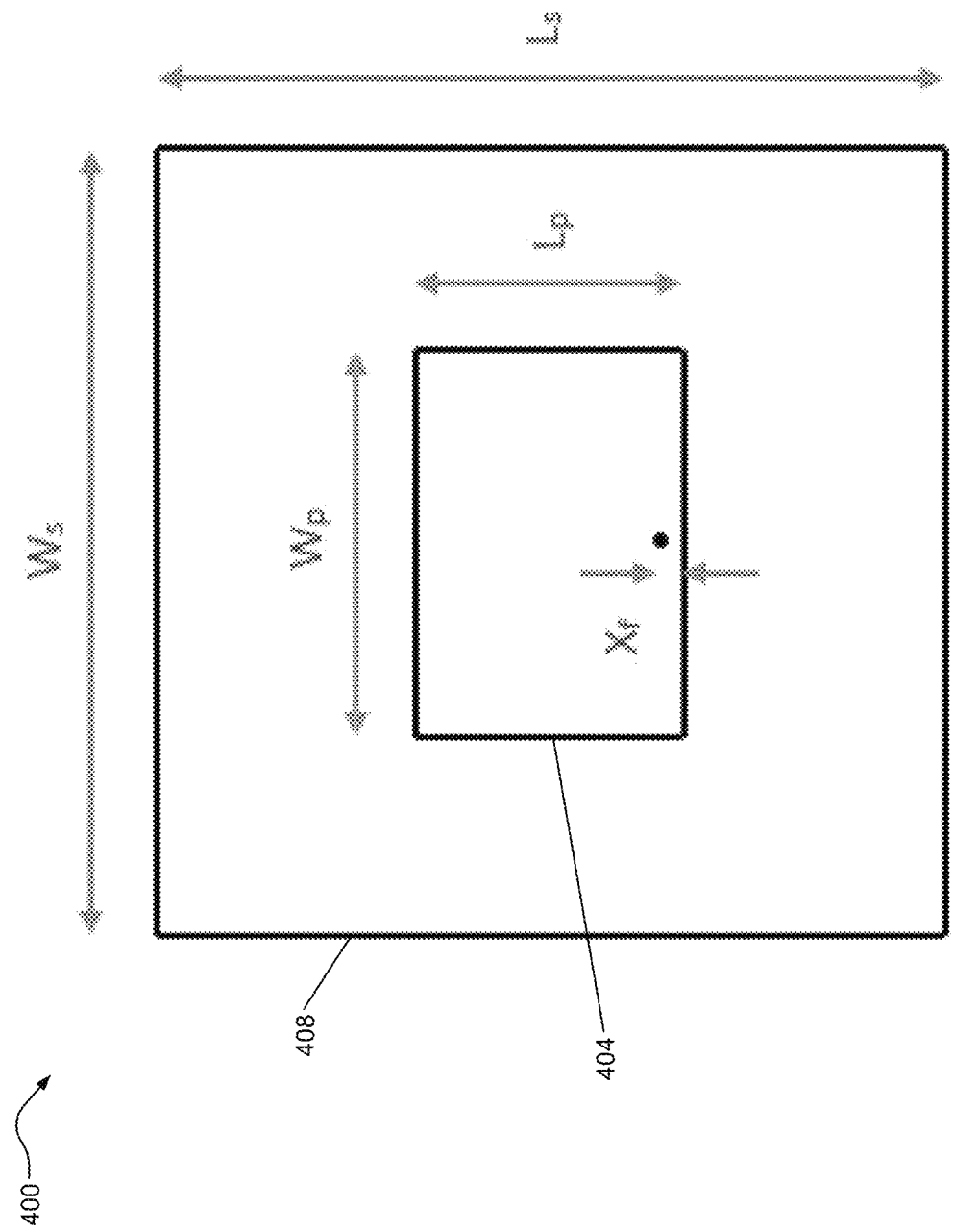
FIG. 4 is a graphical depiction of example dimensions of an example antenna including a patch element mounted on a substrate.

FIG. 4 depicts example dimensions of an example antenna 400 including a patch element 404 mounted on a substrate 408. As mentioned previously, the substrate 408 is mounted a ground between the patch element 404 and ground.

In example embodiments, the patch element 404 is a rectangular patch antenna designed to operate at 6 GHz. The patch element 404 is excited by a coaxial probe fed from behind the ground through the substrate 408. The substrate 408 has a dielectric constant of $\varepsilon_r = 2.2$ and a height of h=3:175 mm (0.125 in.). Additional design parameters of the patch element 404 are included in Table 1 below

| Symbol | Dimension | Length (mm) | Length (in.) |
|---|---|---|---|
| $L_s$ | substrate length | 50.80 | 2.000 |
| $W_s$ | substrate width | 50.80 | 2.000 |
| $L_p$ | patch length | 15.14 | 0.596 |
| $W_p$ | patch width | 20.35 | 0.801 |
| $X_f$ | feed-to-edge distance | 0.711 | 0.028 |

As shown in FIGS. 3 and 4, the geometric center of the patch element 404 may coincide with the geometric center of the substrate 408.

Figure 5:
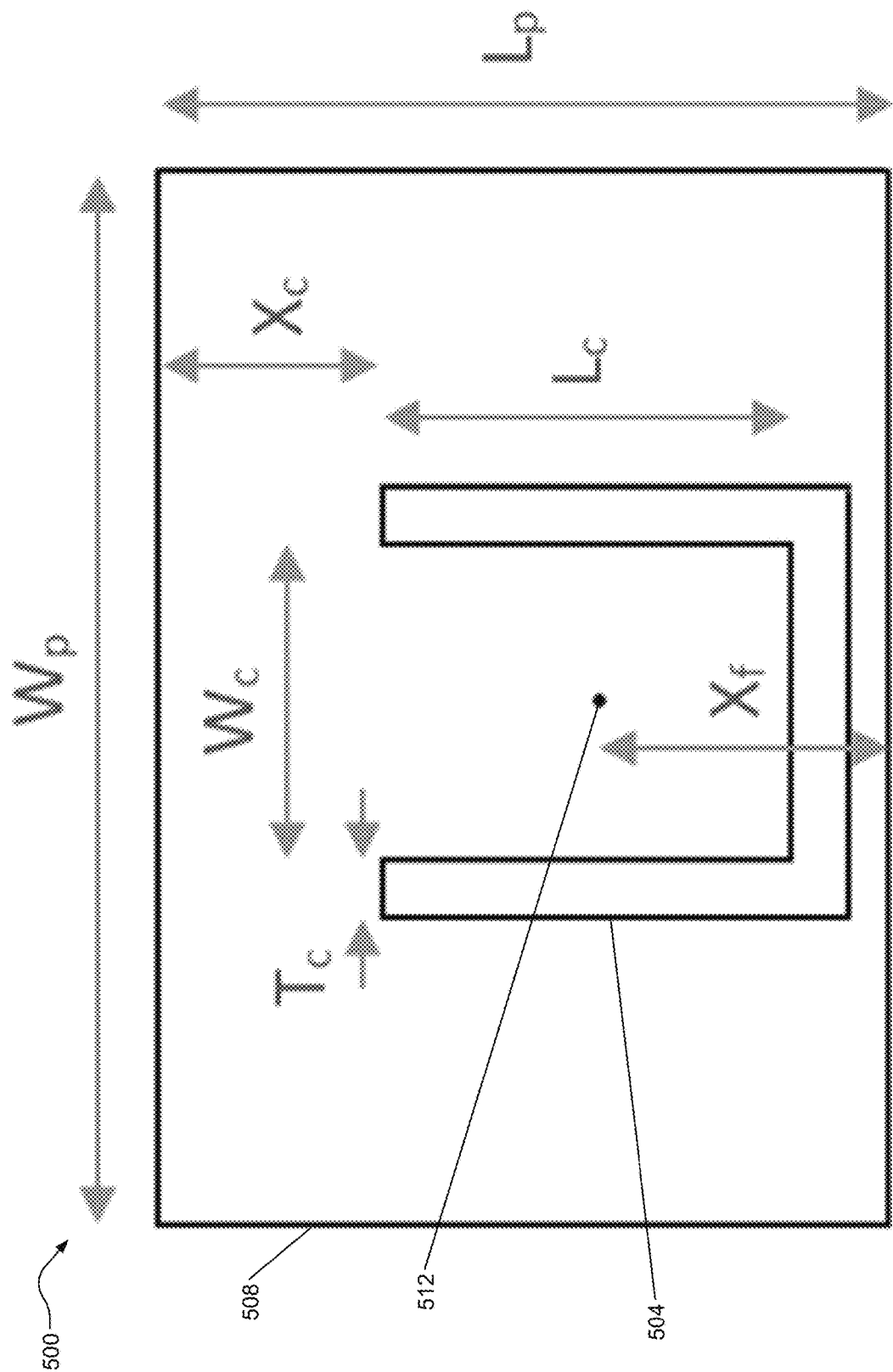
FIG. 5 is a graphical depiction of an example antenna geometry showing dimensions of a U-slot patch element mounted on a substrate and a position of a U-slot feed point.

FIG. 5 is an example antenna 500 geometry showing dimensions of a U-slot patch element 504 mounted on a substrate 508 and a position of a U-slot feed point 512. The substrate 508 is mounted on a ground. The substrate 508 and the ground may be square and positioned such that the geometric centers align with the geometric center of the U-slot patch element 504.

The U-slot patch element 504 is designed to operate over a wide frequency band from 1.7 GHz to 2.2 GHz. The U-slot patch element 504 is excited by a coaxial probe fed from behind the ground through the substrate 508. The substrate 508 may have a dielectric constant of $\varepsilon_r = 2.2$ and a height of h=7.5 mm. The design parameters of the U-slot patch element 504 (as well as an element with no U-slot) are included in Table 2, below:

|        |                      | Length (mm) |          |
| ------ | -------------------- | ----------- | -------- |
| Symbol | Dimension            | U-slot      | No U-slot |
| $L_g$  | ground plane length  | 225         | 225      |
| $W_g$  | ground plane width   | 225         | 225      |
| $L_s$  | substrate length     | 125         | 125      |
| $W_s$  | substrate width      | 125         | 125      |
| $L_p$  | patch length         | 44.1        | 46.9     |
| $W_p$  | patch width          | 63.9        | 67.0     |
| $L_c$  | slot length          | 25.1        | —        |
| $W_c$  | slot width           | 19.0        | —        |
| $T_c$  | slot thickness       | 3.58        | —        |
| $X_c$  | slot-to-edge distance | 13.6       | —        |
| $X_f$  | feed-to-edge distance | 17.95      | 1.25     |

Since the U-slot in the U-slot patch element 504 interferes with the symmetry of the U-slot patch element 504, a second patch element without the slot may be designed to operate at 1.95 GHz, the arithmetic center of the aforementioned band. Although the second patch element cannot operate efficiently over the entire band, its enhanced symmetry should demonstrate improved cancellation when used as a receiver between two U-slotted transmitters, for example, in the configuration of FIG. 1B. The geometry is the same as the U-slotted patch, with the exception of the absence of the slot. The parameters are slightly different, and these values are shown in Table 1. The antenna presents an input reflection coefficient below −25 dB at 1.95 GHz, and provides 7.2 dB of realized gain at this frequency.

FIG. 6 is an example implementation of a feed network 600 for use in wideband applications. For example, the feed network 600 can include a one-hundred-eighty-degree hybrid coupler that functions over a large bandwidth to feed the transmitters perfectly out-of-phase and subtract the received signals. As shown in FIG. 6, the extra-shorted quarter wave lines are required to maintain the symmetry of the design, where $\lambda_c$ is the wavelength at the center frequency of the design band, and the 180 block represents an ideal phase inverter. For example, when using the U-slot geometry or any other wideband applications, the feed network 600 of FIG. 6 may be used to cancel any leakage.

To feed the transmitters perfectly out-of-phase and subtract the received signals over a wide bandwidth, a small deviation from perfect out-of-phase excitation and subtraction is performed. To achieve this, the following Equation 6 and Equation 2 are substituted into Equation 1:

$$V_2^+ = -V_1^+ e^{j\Delta\Phi_T}$$

$$V_R = V_3^- - V_4^- e^{j\Delta\Phi_R}$$

where $\Delta\Phi_T$ and $\Delta\Phi_R$ are the phase variations from one hundred and eighty degrees of the phase differences between the transmitter signals and receiver signals, respectively, and $V_R$ is the total wave coupled to the receivers from the transmitters. In addition to the equation substitution, an impedance mismatch is allowed as in the second and third equations of Equation 3. Then, $V_R$ is as follows in Equation 7:

$$V_R = V_1^+ \frac{S_3(1 - e^{j\Delta\Phi_T})}{(1 - S_1\Gamma_3)(1 - S_1\Gamma_4) - S_2^2\Gamma_3\Gamma_4} \times$$
$$((1 - S_1\Gamma_4 + S_2\Gamma_4) - (1 - S_1\Gamma_3 + S_2\Gamma_3)e^{j\Delta\Phi_R})$$

Based on estimates of the scattering parameters $S_1$, $S_2$, and $S_3$ and the reflection coefficients $\Gamma_3$ and $\Gamma_4$, Equation 7 indicates that the received coupling from the transmitters can be kept below −80 dB if $\Delta\Phi_T$ and $\Delta\Phi_R$ are within about ±3° from zero. Therefore, a wideband hybrid coupler with low phase imbalance may be used to implement a system using symmetric configurations of the present disclosure over a wide bandwidth.

To design a coupler capable of providing a 3 dB power split with a one-hundred-eighty-degree phase difference over a bandwidth of about 25%, a microstrip rat race coupler and a standard coupler for out-of-phase power division are considered. However, due to the presence of the transmission line of length $3\lambda/4$ in a rat race, the perfect phase difference between the outputs is not maintained when the frequency drifts from the center frequency. To address this issue, the $3\lambda/4$ line may be replaced with a coupled line section of length $\lambda/4$ with one end of each line shorted. This configuration behaves like a quarter-wave transmission line in series with an ideal phase inverter.

Using this substitution provides a constant phase difference between the two coupler outputs (port labels 2 and 4 when port label 1 is used as the input) as frequency changes, since the two paths between port labels 1 and 2 have the same physical length as the two paths between port labels 1 and 4. This allows for the design of a wideband one-hundred-eighty-degree coupler. Because of the two shorted quarter-wave lines in the equivalent circuit for the coupled line section, additional shorted quarter-wave lines may be placed near port labels 3 and 4 to maintain the symmetry of the coupler.

Using this method to design a modified rat race coupler, an equal power split with less than 0.6 dB of amplitude imbalance and less than ±0.5° of phase imbalance over the 5.24 GHz-6.94 GHz band (about 28% bandwidth) is achieved. Since the U-slot patch is capable of bandwidth on the order of 25%-30%, the U-slot design may be used with the wideband coupler.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A wireless communication system comprising:
    a ground;
    a substrate mounted on the ground, wherein the substrate is divided into quadrants;
    a first transmitter antenna and a second transmitter antenna configured to transmit a first signal at a predetermined frequency, wherein the first transmitter antenna has a first longitudinal axis and is mounted in a first quadrant of the substrate;
    the second transmitter antenna having a second longitudinal axis and being mounted in a second quadrant of the substrate;
    a first receiver antenna and a second receiver antenna configured to receive a second signal at the predetermined frequency, wherein the first receiver antenna has a third longitudinal axis and is mounted in a third quadrant of the substrate, and wherein the third longitudinal axis of the first receiver antenna is oriented orthogonal to the first longitudinal axis of the first transmitter antenna and the second longitudinal axis of the second transmitter antenna; and the second receiver antenna having a fourth longitudinal axis and is mounted in a fourth quadrant of the substrate, wherein the fourth longitudinal axis of the second receiver antenna is oriented orthogonal to the first longitudinal axis of the first transmitter antenna and the second longitudinal axis of the second transmitter antenna.

2. The system of claim 1, wherein the first transmitter antenna, the second transmitter antenna, the first receiver antenna, and the second receiver antenna are linearly polarized.

3. The system of claim 1, wherein the ground has a Y-axis extending substantially parallel to the first longitudinal axis and the second longitudinal axis and an X-axis extending substantially parallel to the third longitudinal axis and the fourth longitudinal axis, wherein the Y-axis is located at a center of the substrate and the X-axis is located at the center of the substrate, and wherein a feed point of the first transmitter antenna and a feed point of the second transmitter antenna are positioned adjacent to the Y-axis, and wherein a feed point of the first receiver antenna and a feed point of the second receiver antenna are positioned adjacent to the X-axis.

4. The system of claim 3, wherein:
the feed point of the first transmitter antenna is positioned along the third longitudinal axis;
the feed point of the second transmitter antenna is positioned along the fourth longitudinal axis;
the feed point of the first receiver antenna is positioned along the second longitudinal axis; and
the feed point of the second receiver antenna is positioned along the first longitudinal axis.

5. The system of claim 1, wherein:
a geometric center of the first transmitter antenna is located at a geometric center of the first quadrant of the substrate;
a geometric center of the second transmitter antenna is located at a geometric center of the second quadrant of the substrate;
a geometric center of the first receiver antenna is located at a geometric center of the third quadrant of the substrate; and
a geometric center of the second receiver antenna is located at a geometric center of the fourth quadrant of the substrate.

6. The system of claim 1, wherein the first transmitter antenna, the second transmitter antenna, the first receiver antenna, and the second receiver antenna are rectangular patch antennas.

7. The system of claim 1, wherein the first transmitter antenna, the second transmitter antenna, the first receiver antenna, and the second receiver antenna are U-slot patch antennas.

8. The system of claim 7, wherein the U-slot patch antennas have a slot thickness of 3.58 millimeters, a slot width of 19 millimeters, and a slot length of 25.1 millimeters.

9. The system of claim 7, wherein the system is coupled to a feed network configured to feed a current to the first transmitter antenna and the second transmitter antenna one hundred and eighty degrees out-of-phase.

10. The system of claim 9, wherein the feed network is configured to subtract signals received from the first receiver antenna and the second receiver antenna.

11. The system of claim 1, wherein:
the first transmitter antenna is in direct physical contact with the substrate;
the second transmitter antenna is in direct physical contact with the substrate;
the first receiver antenna is in direct physical contact with the substrate; and
the second receiver antenna is in direct physical contact with the substrate.

12. An antenna system comprising:
a ground;
a substrate mounted on the ground, wherein the substrate is divided into quadrants;
a first transmitter antenna and a second transmitter antenna configured to transmit a first signal at a predetermined frequency, wherein the first transmitter antenna has a first longitudinal axis and is mounted in a first quadrant of the substrate, and wherein the first transmitter antenna is in direct physical contact with the substrate;
the second transmitter antenna having a second longitudinal axis and being mounted in a second quadrant of the substrate, wherein the second transmitter antenna is in direct physical contact with the substrate;
a first receiver antenna and a second receiver antenna configured to receive a second signal at the predetermined frequency, wherein the first receiver antenna has a third longitudinal axis and is mounted in a third quadrant of the substrate, wherein the first receiver antenna is in direct physical contact with the substrate, and wherein the third longitudinal axis of the first receiver antenna is oriented orthogonal to the first longitudinal axis of the first transmitter antenna and the second longitudinal axis of the second transmitter antenna;
the second receiver antenna having a fourth longitudinal axis and is mounted in a fourth quadrant of the substrate, wherein the second receiver antenna is in direct physical contact with the substrate, wherein the fourth longitudinal axis of the second receiver antenna is oriented orthogonal to the first longitudinal axis of the first transmitter antenna and the second longitudinal axis of the second transmitter antenna; and
a feed network configured to feed the first transmitter antenna and the second transmitter antenna one hundred and eighty degrees out-of-phase and subtract signals received from the first receiver antenna and the second receiver antenna.

* * * * *